April 19, 1966  J. E. MORSE  3,246,857
STRIP HANDLING DEVICE
Filed Dec. 26, 1963
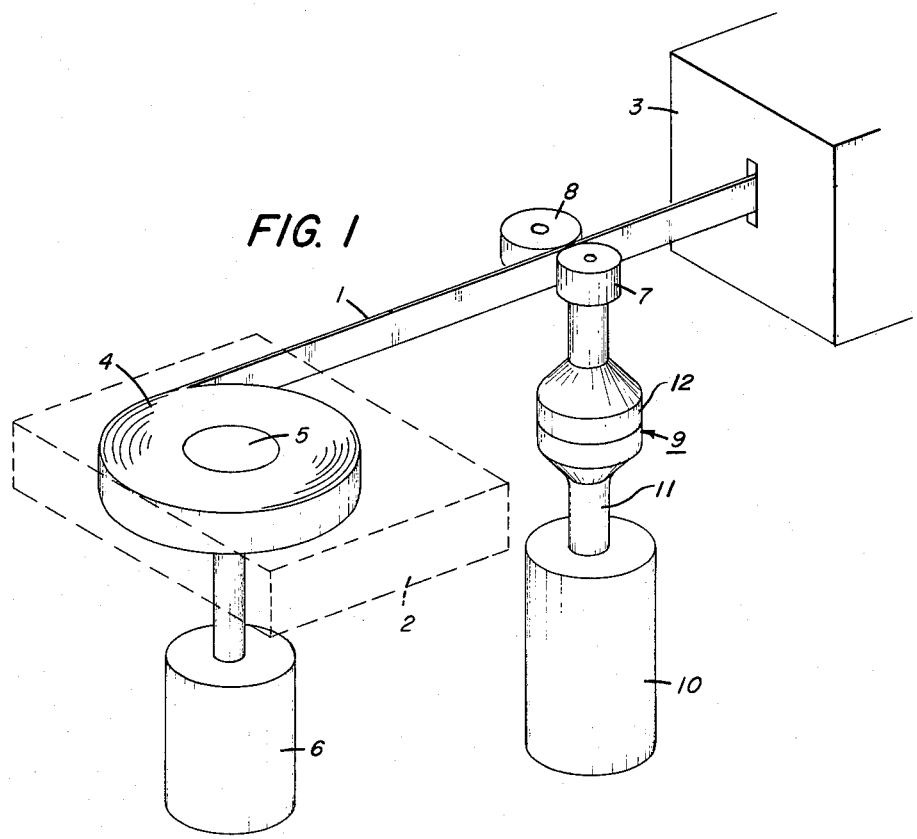
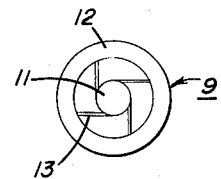
JOHN E. MORSE
INVENTOR.
BY
ATTORNEYS 3,246,857
STRIP HANDLING DEVICE
John E. Morse, Rochester, N.Y., assignor to Eastman Kodak Company, Rochester, N.Y., a corporation of New Jersey
Filed Dec. 26, 1963, Ser. No. 333,414
Claims priority, application Great Britain, Apr. 30, 1963, 16,885/63
9 Claims. (Cl. 242—55.12)

This invention relates to a strip handling device and more particularly to a device for controlling and directing the winding and unwinding movement of strip material into or from a supply thereof.

The strip handling device of the present invention is particularly useful in apparatus in which photographic film is selectively unwound from a supply or rewound into said supply during the course of viewing or other use. Consequently, it will be described herein as it could be used in such photographic apparatus, but it is to be understood that the device of the present invention could be used with equal facility and advantage in other strip handling devices and that therefore the following description is provided for illustrative purposes only. One problem which is sometimes encountered in the manipulating of flexible strips is that of damage to the strip caused by the driving of the strip back into the supply at a rate which is faster than the independently driven supply can wind up the strip. This results in the strip buckling and/or jamming in the associated strip driving mechanism. The device of the present invention avoids this difficulty and comprises broadly means for driving the strip in a rewind direction into the supply at a rate which is no faster than that at which the supply at any given time is taking up the returning strip. This is accomplished by rendering the strip driving means inoperative whenever tension in the strip between the strip driving means and the drive for the strip supply is lost.

One object of the present invention is therefore to provide an improved strip handling mechanism.

Another object of the present invention is to provide a device for controlling and directing the winding and unwinding of flexible strip material relative to a supply thereof.

Another object of the present invention is to provide a device for use in conjunction with a film handling apparatus for rendering the strip driving means inoperative whenever tension in the strip is lost between the strip driving means and the supply to which the strip is being returned.

Yet another object of the present invention is to provide a strip handling device which reduces or substantially eliminates the possibility of damaging the strip because of overfeeding during rewind.

Still other objects and advantages of the present invention will become readily apparent to those skilled in the art from the following description with reference to the drawings in which like characters denote like parts and wherein:

FIGURE 1 is a schematic view of a strip handling device incorporating the present invention; and FIGURE 2 is a diagrammatic view of the clutch utilized in the device shown in FIGURE 1.

In FIGURE 1 the numeral 1 designates a strip of film, for example, microfilm, which is selectively moved between a supply such as, for example, a film magazine 2, and a device 3 in which the film is moved for scanning, viewing, exposing, printing, processing or any other desired purpose. The magazine 2 contains a roll 4 of film wound on a core 5. The motor 6 is energized from a suitable power source not shown and applies a constant torque on the core 5 through a magnetic or other coupling not shown, tending to drive the core and roll in a strip winding direction, that is, counterclockwise as viewed in FIGURE 1. The numerals 7 and 8 designate strip engaging rollers which drive the strip 1 either toward or away from the magazine 2 in the manner to be hereinafter set forth. Roller 7 is coupled through a clutch 9 to a reversible motor 10 which is energized from a suitable power source not shown. The direction of drive of the motor 10 is selectively controlled by the operator in the usual manner by switches and associated electrical circuitry.

The clutch 9 as shown in FIGURE 2 comprises a shaft 11 which is connected to and driven by motor 10 and an outer rotor 12 which is carried in fixed relation by the shaft which drives roller 7. As shown in FIGURE 2, the inner peripheral surface of rotor 12 is concentrically mounted with respect to the outer periphery of the shaft 11. Four resilient leaves 13 are equally spaced circumferentially about and attached on one end to the periphery of shaft 11. The free ends of the leaves 13 extend tangentially from the shaft periphery and are sufficiently long that the free ends engage the inner periphery of rotor 12. Thus, as viewed in FIGURE 2, clockwise rotation of shaft 11 is transmitted through the leaves 13 to the rotor 12, but counterclockwise rotation of shaft 11 is transmitted to rotor 12 only when there is a load on the rotor 12 tending to rotate the rotor counterclockwise at a rate faster than shaft 11 is able to drive the rotor.

The operation of the film handling device of the present invention will now be described. Let us assume that the strip 1 is engaged between the rollers 7 and 8 and that the motor 10 is energized to drive the strip toward the device 3, that is, to unwind strip from the supply thereof. In order to unwind the strip, the torque of motor 10 must be increased sufficiently to overcome the wind-up torque which is applied by motor 6 to the roll 4. When it is desired to return the unwound strip back onto the roll 4, the motor 10 is reversed. The torque of motor 6 is then sufficient to drive the roll 4 in a counterclockwise direction. Motors 6 and 10 are selected such that acting alone motor 6 would rewind the strip on the roll 4 at a peripheral speed greater than that at which the motor 10 is capable of driving it toward the magazine 2. Thus, during normal operation the motor 10 through clutch 9 and roller 7 acts as a brake on the strip 1 and tension in the strip 1 between the periphery of roll 4 and the drive rollers 7 and 8 is maintained by the motor 6. The tension in the strip is adequate to maintain the leaves 13 of clutch 9 in engagement with the inner periphery of rotor 12 with the result that the motor 10 controls the speed at which the strip is returned into the supply. If, however, something occurs during rewinding of the strip to cause a loss of tension in the strip between the periphery of roll 4 and the roller 7 and 8 (for example, failure of motor 6, or dicoupling of motor 6 from the core 5), the leaves 13 are no longer held in engagement with the inner periphery of rotor 12, and consequently, the rotor 12 does not receive driving torque from the motor 10 and the driving of the strip towards the magazine by motor 10 is immediately halted. Since the motor 10 is rendered ineffective to drive further lengths of strip towards the magazine 2, the possibility of the strip winding around some rotating part in the strip drive, jamming the machine and damaging the strip is greatly reduced or eliminated.

It is realized that other forms of unidirectional (one way) clutches could be used in place of clutch 9. However, in selecting a clutch, it is important to obtain one which is released with very light forces, such as the loss of tension in the strip so that the important safety features from the standpoint of possible strip damage which is provided by the device of the present invention will be assured.

The invention has been described in considerable detail with particular reference to certain preferred embodiments thereof, but it will be understood that variations and modifications can be effected within the spirit and scope of the invention as described hereinabove, and as defined in the appended claims.

Having now particularly described my invention what I desire to secure by Letter Patent of the United States and what I claim is:

1. A device for controlling linear movement of a flexible strip relative to its supply roll comprising:
   (a) means for applying torque in a roll winding direction to said supply roll;
   (b) bidirectionally rotating drive means spaced from said torque applying means for imparting forces to said strip which selectively
      (1) drive the strip in a roll unwinding direction during rotation of the drive means in a roll unwinding direction to overcome the moving effect of said torque applying means; and
      (2) retard the strip's movement in said winding direction during rotation of the drive means in a roll winding direction so as to control the moving effect of said torque applying means;
         said drive means including one way clutch means for transmitting retarding forces within said drive means only when the strip between said drive means and said supply is under tension.

2. A device according to claim 1 wherein
   (a) said torque applying means comprises a first motor connected to said roll supply, and
   (b) said drive means further includes a strip contacting means and a reversible motor operatively connected to said strip contacting means through said one-way clutch means.

3. A device in accordance with claim 2 wherein the moving effect of said reversible motor on said clutch means in said roll winding direction is less than the moving effect of said first motor through said strip upon said strip contacting means whereby said clutch means is engaged and the portion of said strip between said supply and said contacting means is maintained under tension.

4. A device for controlling linear movement of a flexible strip relative to a predetermined point in the path of movement of said strip comprising:
   (a) means for urging said strip to move in one direction relative to said point;
   (b) strip contacting means spaced from said strip urging means for imparting forces to the strip which
      (1) drive said strip during movement in the direction opposite said one direction and
      (2) frictionally retard said strip druing movement in said one direction;
   (c) reversible motor means for selectively producing forces in said one direction or said opposite direction;
   (d) clutch means connecting said strip contacting means and said reversible motor means for transmitting to said contacting means only those forces from said motor means which urge said strip in said opposite direction.

5. A device according to claim 4 wherein the force produced by said motor means in said opposite direction is greater than the force of said urging means in said one direction whereby said strip is moved in said opposite direction when said motor means is selectively operated in said opposite direction.

6. A device for controlling linear movement of a flexible strip relative to a predetermined point in the path of movement of said strip comprising:
   (a) means for urging said strip to move in one direction relative to said point;
   (b) strip contacting means spaced from said strip urging means for imparting forces to the strip which
      (1) drive said strip during movement in the direction opposite said one direction and
      (2) frictionally retard said strip during movement in said one direction;
   (c) reversible motor means for selectively producing forces in said one direction or said opposite direction;
   (d) clutch means connecting said strip contacting means and said reversible motor means for transmitting retarding forces to said strip contacting means only when the strip between said strip contacting means and said urging means is in tension.

7. A device for controlling linear movement of a flexible strip relative to a predetermined point in the path of movement of said strip comprising:
   (a) means for urging said strip to move in one direction relative to said point;
   (b) strip contacting means spaced from said strip urging means for imparting forces which
      (1) drive said strip during movement in the direction opposite said one direction and
      (2) frictionally retard said strip during movement in said one direction;
   (c) clutch means comprising a first section fixedly connected to said strip contacting means;
   (d) reversible motor means for selectively producing forces in said one direction or said opposite direction;
      said clutch means further comprising a unidirectional engaging means fixedly connected to said motor means and engagable with said first section for transmitting thereto only those forces from said motor means in said opposite direction.

8. A device in accordance with claim 7 wherein the rate of movement of said engaging means in said one direction is less than the rate of movement of said urging means in said one direction whereby said engaging means engages said first clutch section and said strip contacting means retards the movement of said strip.

9. A device for controlling the tension and linear movement of a flexible strip material comprising a supply roll for the strip, a first drive means for continuously urging said roll in a winding direction, a second reversible drive means spaced from said strip roll and contacting said strip, said second drive means including a one-way clutch means for transmitting to said strip only those forces in an unwinding direction, said second drive means moving at a rate less than said first drive means during rotation in a winding direction but having more torque than said first drive means so as to overcome the driving effect of said first drive means during rotation in said unwinding direction.

References Cited by the Examiner
UNITED STATES PATENTS 2,071,192  2/1937  Younts _____ 242—55.12
2,656,129  10/1953 De Turk et al. ___ 242—55.12 X
2,861,752  11/1958 Palmer _____ 242—55.11

MERVIN STEIN, *Primary Examiner.*
STANLEY N. GILREATH, *Examiner.*
WILLIAM S. BURDEN, *Assistant Examiner.*